United States Patent [19]

Schmitt et al.

[11] Patent Number: 6,038,919
[45] Date of Patent: Mar. 21, 2000

[54] MEASUREMENT OF QUANTITY OF INCOMPRESSIBLE SUBSTANCE IN A CLOSED CONTAINER

[75] Inventors: John V. Schmitt, Sunnyvale, Calif.; Richard A. Marsh, Austin, Tex.

[73] Assignee: Applied Materials Inc., Santa Clara, Calif.

[21] Appl. No.: 08/870,961

[22] Filed: Jun. 6, 1997

[51] Int. Cl.[7] .................................................. G01F 17/00
[52] U.S. Cl. ........................ 73/149; 73/290 B; 73/861.42
[58] Field of Search ................... 73/149, 290 B, 73/1.73, 290 R, 49.2, 40.5 R, 291, 861, 861.42

[56] References Cited

U.S. PATENT DOCUMENTS

| | | |
|---|---|---|
| 4,393,013 | 7/1983 | McMenamin . |
| 4,553,431 | 11/1985 | Nicolai .................................. 73/290 B |
| 4,840,064 | 6/1989 | Fudim .................................... 73/290 B |
| 5,001,924 | 3/1991 | Walter et al. ............................. 73/149 |
| 5,535,624 | 7/1996 | Lehmann . |
| 5,760,294 | 6/1998 | Lehmann . |
| 5,810,058 | 9/1998 | Kountz et al. ............................ 73/149 |

FOREIGN PATENT DOCUMENTS

| | | |
|---|---|---|
| 0286158 | 3/1988 | European Pat. Off. . |
| 0460511 | 5/1991 | European Pat. Off. . |
| 0666340 | 2/1995 | European Pat. Off. . |
| 3206130 | 2/1983 | Germany . |
| 3929506 | 9/1989 | Germany . |
| 0689038 | 6/1995 | Germany . |
| 60212908 | 9/1985 | Japan . |
| 02111518 | 4/1990 | Japan . |

OTHER PUBLICATIONS

U.S. patent application serial No. 08/928,371, filed Sep. 12, 1997 (Atty. Dk. # 2041/PVD/DV).
U.S. patent application serial No. 08/922,510, filed Sep. 3, 1997 (Atty. Dk. #2036/PVD/DV).

Primary Examiner—Hezron Williams
Assistant Examiner—Thuy Vinh Tran
Attorney, Agent, or Firm—Charles S. Guenzer

[57] ABSTRACT

In a process and apparatus for delivering a processing substance from a storage vessel to a processing station, the storage vessel enclosing a processing substance storage space and being coupled to conduits which communicate with the storage space, the storage vessel and the conduits enclosing a volume which includes the storage space, a method and system for determining the quantity of processing substance in the storage space by: closing the volume enclosed by the storage vessel and the conduits; performing first and second pressure measurements for measuring the gas pressure in the volume when the volume contains respectively first and second quantities of gas; determining the difference between the first and second quantities of gas; and calculating the quantity of processing substance in the storage space on the basis of the volume, the difference between the first and second quantities of gas and the gas pressures measured during the first and second pressure measurements.

21 Claims, 1 Drawing Sheet

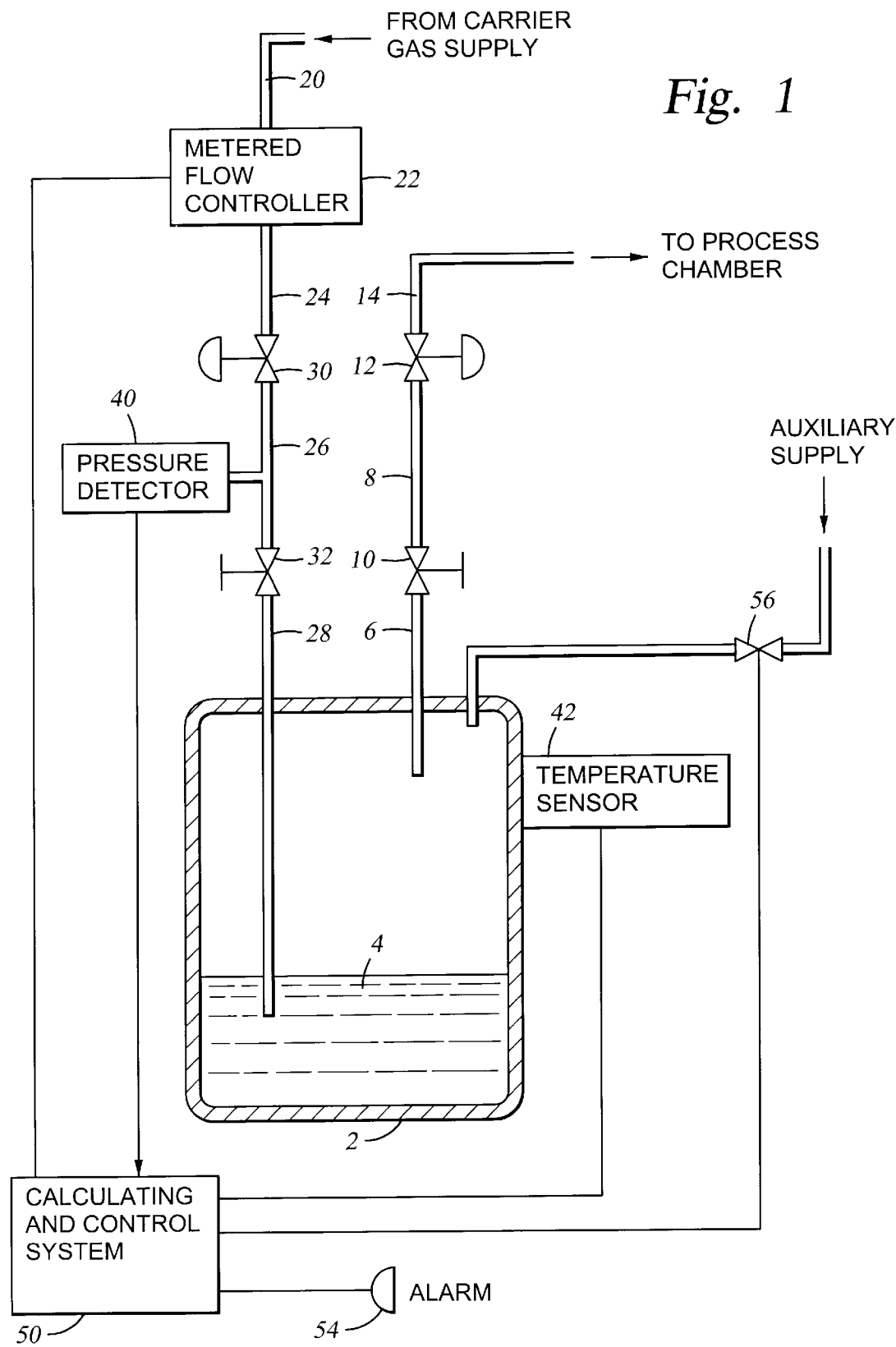

MEASUREMENT OF QUANTITY OF INCOMPRESSIBLE SUBSTANCE IN A CLOSED CONTAINER

BACKGROUND OF THE INVENTION

The present invention relates to industrial chemical processes in which a processing chemical initially in the form of a liquid or solid is converted to the gas or vapor state, in which state it is conveyed to a processing station.

In many industrial chemical processes, a processing substance is stored in a container in a liquid or solid state and this supply of processing substance is gradually exhausted as the process in which it is utilized proceeds. When the supply of processing substance is completely exhausted, it is frequently necessary to halt the process in order to replace or replenish the container. When the process is allowed to continue until the supply of processing substance is completely exhausted, there can be a period of time during which unacceptable results are produced.

In the case of many processing substances, known techniques for monitoring the fill level of the container are not well suited because level sensors introduced into the container may react in an unacceptable manner with the substance. This could contaminate the substance and/or deteriorate the measuring device. In addition, mounting of the measuring device in the container may create substantial problems in connection with sealing of the container at the point where the measuring device or its connecting lines pass into the container.

One significant example of the problems described above is found in semiconductor fabrication procedures in which dimethyl aluminum hydride (DMAH) is delivered in the form of a vapor to wafers in order to form aluminum films thereon. DMAH is a highly flammable, explosive and toxic substance. Therefore, its container should be securely and permanently sealed during use. Vapors of this substance are produced by introducing a gas via a conduit which extends below the surface of the substance and which bubbles through the substance to produce the vapor. Since this vapor will fill the container, any devices installed in the container may acquire an aluminum coating. Therefore, it is believed that a satisfactory technique for monitoring the quantity of substance remaining in the container has not heretofore been devised.

If an attempt is made to utilize all of the substance in the container, and no means are available for monitoring the quantity of substance remaining in the container, complete exhaustion of the substance will only become apparent from the fact that the wafers being fabricated are defective. Given the realities of semiconductor fabrication procedures, this fact may not become apparent until a large number of wafers have proceeded through the fabrication process and have become defective resulting in a considerable economic loss which may be as high as tens of thousands of dollars.

In view of this difficulty, one practice in the art has been to make a prediction as to when a safe proportion of the substance in a container has been used and, at that time, to replace that container with a fresh container and return the used container to a supplier for refilling. The result is that a substantial amount of the substance, which is itself expensive, is not used.

Thus, whether a semiconductor fabrication process is performed in a manner which uses all of the substance in a container or in a manner which uses only a selected portion of that substance, the result can be a considerable economic loss.

BRIEF SUMMARY OF THE INVENTION

It is a primary object of the present invention to monitor the fill level of such containers, and particularly containers forming part of sealed systems, in a manner which avoids the drawbacks known to exist in the prior art.

A more specific object of the present invention is to monitor the fill level of such processing substances in a manner which requires a minimum amount of added components for performing the monitoring operation and which does not have any adverse affect on the processing substance or the monitoring devices.

The above and other objects are achieved, according to the present invention, in a process and apparatus for delivering a processing substance from a storage vessel to a processing station, in which the quantity of processing substance in the storage vessel may be determined by determining the volume occupied by a gas in a selected volume which includes the internal volume of the storage vessel. If the total volume of the selected volume is known, the volume or quantity of the processing substance may be readily determined by subtracting the determined gas volume from the selected volume. In the illustrated embodiment, the processing substance volume is calculated by first closing the selected volume which encloses the storage vessel and associated conduits; performing first and second pressure measurements for measuring the gas pressure in the selected volume when the selected volume contains respectively first and second quantities of gas; determining the difference between the first and second quantities of gas; and calculating the quantity of processing substance in the storage space on the basis of the known size of the selected volume, the difference between the first and second quantities of gas and the gas pressures measured during the first and second pressure measurements.

BRIEF DESCRIPTION OF THE SEVERAL VIEWS OF THE DRAWING

The sole FIGURE is a schematic diagram showing a sealed system equipped with components for performing the monitoring operation according to the present invention.

DETAILED DESCRIPTION OF THE INVENTION

The present invention provides a method and apparatus for monitoring the quantity of processing substance present in a container in a manner which eliminates any need to introduce into the container any measuring device that could be damaged by the substance.

The interior of the container and of passages, or conduits, communicating with the interior of the container can be considered to be composed of two volumes: the volume occupied by the processing substance; and the volume occupied by gas, the latter volume referred to herein as a head space. In one embodiment of the invention, the size of the volume occupied by the processing substance is determined basically by changing the quantity, or mass, of a gas present in the head space, measuring the resulting gas pressure before and after the quantity change and calculating the size of the volume occupied by the processing substance based on knowledge of the two measured pressure values, the magnitude of the gas quantity change and the sum of the two volumes, which sum is equal to the volume of the interior of a completely empty container and of the passages communicating therewith and which is known or can be determined in advance.

The sole FIGURE illustrates a system according to the invention for monitoring and controlling the fill level of a closed vessel 2 which may be in the form of a closed ampule containing a quantity of a processing substance 4, which substance is preferably a substantially incompressible liquid or solid. In order to be delivered to a processing station, substance 4 is progressively vaporized or gasified and then delivered via conduits 6 and 8 and valves 10 and 12 to an outlet line 14 which leads to the processing station. Line 14 is connected to control devices which are suitable for the process being performed.

Vaporization of the substance may be performed by supplying a suitable carrier gas to the interior of vessel 2 so that the carrier gas bubbles through the substance in the container, at least when the substance is a liquid, in order to produce a vapor which fills the region of the container above the level of the substance. The carrier gas may be delivered at a rate selected to maintain the interior of vessel 2 at a suitable pressure. The carrier gas is delivered from a carrier gas supply and has a composition which is appropriate for the specific process being performed and the specific processing substance employed. The carrier gas may be delivered via a line 20, a conventional metered flow controller 22, conduits 24, 26 and 28 and controllable valves 30 and 32. Alternatively, carrier gas for vaporizing or gasifying substance 4 may be delivered via a separate line connected to conduit 24, 26, or 28, which separate line is provided with an appropriate valve.

The pressure of the gas may be monitored by a pressure detector 40 connected in communication with conduit 26, as shown, or with conduit 24 or 28.

In addition, a system according to the invention may optionally be provided with a temperature sensor 42 mounted at any suitable location to monitor the temperature within vessel 2. However, if the system is disposed in an installation which is maintained at a relatively constant temperature, a temperature sensor may be readily eliminated and the measurement operation can be performed while assuming a known, constant temperature value.

The outputs of pressure detector 40 and, if provided, temperature sensor 42 are supplied to a calculating and control system 50. System 50 can be implemented by appropriate programming of conventional general purpose data processing devices including workstations, or by a dedicated calculating and control device constructed in accordance with principles well-known in the art. In view of the simplicity of the calculating and control operations to be performed, as will become more readily apparent from the description to be presented below, it will be apparent that implementation of system 50, either by appropriate software for a general purpose data processor or in the form of a dedicated unit, would be a matter of routine to those skilled in the art.

System 50 may be further connected to metered flow controller 22 as well as to an alarm device 54. System 50 may also have an output connected to an electrically operated valve 56 connected in a line between an auxiliary supply of processing substance and the interior of vessel 2. System 50 may additionally be connected to control the opening and closing of valve 12.

A measuring process according to one embodiment of the invention is carried out in the following manner. In a first step, valve 12 is closed. At this time, the conduits shown in double lines communicate with the interior of vessel 2 and together with the interior volume of the vessel 2, define a selected volume or measurement volume which will be used to determine the volume of processing substance occupying the interior of the vessel 2. After valve 12 is closed to enclose the measurement volume, metered flow controller 22 is operated, under control of system 50, to begin delivery of a suitable gas into the measurement volume at a metered mass flow rate. Just before, simultaneously with, or shortly after, the start of the delivery of gas at a metered mass flow rate, the pressure being detected by detector 40 is stored in system 50 as a first pressure measurement. Then, at a subsequent time, after a sufficient quantity of gas has been delivered to allow the pressure in the volume enclosed by vessel 2 and conduits 6, 8, 24, 26 and 28 to increase by an amount sufficient to allow achievement of an acceptably accurate volume calculation, the pressure being detected by detector 40 is stored in system 50 as a second pressure measurement. In addition, an indication of the time difference between either the start of delivery of gas or the first pressure measurement, whichever is later, and the second pressure measurement is stored in system 50. Specifically, if the first measurement is performed after the start of delivery of gas, then the time difference is measured from the first pressure measurement; if the first measurement is performed before the start of delivery of gas, then the time difference is measured from the start of delivery of gas.

This information, along with stored data representing the total measurement volume enclosed by vessel 2, conduits 6, 8, 24, 26 and 28 and valves 10, 30 and 32 when no processing substance 4 is contained in vessel 2, along with possibly the temperature sensed by temperature sensor 42, constitute all of the data necessary to allow calculation of the quantity of processing substance 4 present in vessel 2. Then, in system 50, the total quantity $V_l$ of processing substance 4 may be calculated. The calculation performed can be based on the following:

First, the total volume, $V_g$, of gas present in vessel 2, conduits 6, 8, 24, 26 and 28 and valves 10, 30 and 32 can be calculated as follows:

$$V_g = \frac{k(t_2 - t_1)T_k}{(P_2 - P_1)} \qquad \text{Eq. 1}$$

where:

k is a constant characteristic of the gas, the gas flow rate and the measurement units employed;

$t_2$ and $t_1$ are the ending time and the starting time, respectively, of the pressure measurements;

$T_k$ is the absolute temperature of the system; and $P_2$ and $P_1$ are the measured pressures at the ending time $t_2$ and the starting time $t_1$, respectively.

Then, the total quantity $V_l$ of processing substance 4 is calculated according to the following equation:

$$V_l = V_a - V_g \qquad \text{Eq.2}$$

where $V_a$ is the total volume of the selected measurement volume which includes the vessel 2 and the lines communicating therewith.

In the above equations, if the times, t, are expressed in seconds, the temperature, $T_k$, is expressed in units of ° Kelvin, the pressures, P, are expressed in units of Torr, the volumes are expressed in liters, the flow measured in units of SCCM and the gas introduced during the measurement procedure is argon, which is one of the preferred inert gasses to be used in the practice of the invention, k will have a value of $4.642 \times 10^{-5}$.

Of course, system 50 can also be implemented to calculate $V_l$ in a single calculating operation according to an equation which combines equations 1 and 2. Still further, the quantity of processing substances can be monitored, in effect, merely by calculating the volume $V_g$ of gas present in the head space without ever actually calculating the quantity of processing substance remaining because of the known relationship ($V_a=V_l+V_g$) between these two volumes.

According to a further feature of the invention, the value of $V_a$ can be determined by the same method as that described above when it is known that vessel 2 is completely empty (or emptied to a selected minimum level at which further emptying of processing substance is not desired). In this case, of course, $V_l=0$, so that $V_a=V_g$. In other words, the system can be calibrated to obtain the value of $V_a$ before carrying out processing substance quantity measuring operations, without requiring any physical measurements of the interior of vessel 2 and the interiors of the various conduits and valves communicating therewith during measuring operations.

It will be apparent that in the procedure described above, the quantity of gas delivered to the closed volume is known on the basis of the gas mass flow rate and the time interval, or difference, between the first and second pressure measurements. Alternatively, a fixed quantity of gas can be delivered, preceded by the first pressure measurement and followed by the second pressure measurement, in which case a separate time difference determination is not required.

It should also be noted that the invention can be implemented by removing gas at a fixed flow rate or by removing a known quantity of gas. In this case, the denominator of the right-hand side of equation 1 would be $P_1-P_2$.

One example of a system and method according to the invention could be for measuring the quantity of dimethyl aluminum hydride (DMAH) stored in an ampule in a system in which the DMAH is delivered to a chamber for depositing aluminum films on wafers in connection with a semiconductor fabrication procedure. The space enclosed by such an ampule and the conduits and valves with which the interior of the ampule will be in communication during a measurement operation can be of the order of 1.3 liters. The gas employed for the measurement operation can be any suitable inert gas, such as argon, and this gas can be delivered by metered flow controller 22 at a rate of the order of 300 SCCM while generating a maximum pressure of the order of 200 Torr. The measurement time, between measurement of pressures $P_1$ and $P_2$, can be less than 60 seconds and, in many cases, can be of the order of 3 or 4 seconds.

A specific example of such measuring procedure, controlled entirely by appropriate software, is illustrated by the following steps:

1. The current ampule temperature, in ° C., is input by the operator. The temperature can be in the range of 0° C. to 200° C. In the absence of an operator input, a default value of 45° is selected by the software program.

2. The input or default temperature is converted to units of °K.

3. The pressure being read by detector 40 is set to a suitably low value, preferably less than 50 Torr, and valve 12 is closed.

4. Delivery of argon via controller 22 is initiated at a flow rate of 300 SCCM.

5. After 3 seconds of gas flow, to allow for gas stabilization, $P_1$ and $t_7$ are measured and recorded.

6. Gas flow continues at a rate of 300 SCCM until either one of the following conditions occurs: the total test time reaches a maximum allowed value, e.g. 60 seconds after initiation of gas flow; or the measured pressure reaches a maximum allowed value, e.g. 200 Torr. When either one of these conditions occurs, $P_2$ and $T_2$ are measured and recorded.

7. Gas may then be allowed to flow out of the ampule.

8. The volume of processing substance in the ampule is calculated.

It has been found that measurements according to the present invention can provide an indication of the quantity of processing substance 4 remaining in vessel 2 with an accuracy of the order of 2–3%.

If the measurement indicates that the quantity of substance 4 is below a predetermined value, system 50 can emit an alarm via device 54 to warn that the ampule 2 should be replaced. In some applications, it may be possible to open a valve 56 to replenish the supply of substance 4 in vessel 2.

It will be noted that in the illustrated embodiment, pressure detector 40 is connected in a conduit 26 which is located upstream of vessel 2 with respect to the direction of flow of carrier gas. This location is advantageous because it prevents exposed surfaces of pressure detector 40 from being attacked by the processing substance 4, which may be a plating substance or an etching substance.

In the performance of a measuring operation according to the present invention, the maximum pressure created within vessel 2 can be within the range normally employed for placing the substance in a gas or vapor state for use in an associated process. Therefore, a measurement procedure according to the invention need not raise any safety risks.

Because a pressure measurement according to the invention can be performed in a relatively short period of time, system 50 can be constructed to automatically perform the pressure measurement at frequent intervals. For example, pressure measurement could be performed each time valve 12 is closed during the normal course of the process for which processing substance 4 is employed.

The invention can be applied to the measurement of virtually any processing substance which is initially in liquid or solid form and in virtually any chemical processing installation. Because the measuring operation is based on detection of gas pressure, and the gas pressure detector can be coupled to the conduits which supply gas to the pressure vessel, virtually all contact between the processing substance and the detector are avoided. Therefore, the invention can be applied to the measurement of corrosive processing substances or processing substances which would tend to plate any surface with which they come in contact.

Other processing substances which may be monitored according to the present invention include, but are not limited to, titanium nitrate compounds such as TDMAT, silicon compounds such as TEOS, boron compounds such as TMB, phosphorus compounds such as TMP, and copper compounds such as VTMS.

It should be understood that in a system embodying the present invention, the gas normally employed for placing processing substance 4 in a gaseous or vapor state for delivery to a processing station can be different from the gas employed during the measurement and can be supplied via an additional set of conduits coupled, for example, to conduit 26 or 28.

There are existing industrial processing systems which are already provided with all of the components shown in the FIGURE, with the exception of the volume measurement programming for the calculating and control system 50 described above and associated alarm 54. Therefore, a further advantage of the invention is that it can be applied to such systems in a relatively simple and inexpensive manner.

It should further be noted that it has been found that the relation between the data obtained by a process according to the present invention and the quantity of processing substance present in vessel 2 has been found to have a linear relation over a wide range of carrier gas flow rates and pressure variations. Hence, satisfactory accuracy may be obtained over similarly wide ranges of gas flow rates and pressure variations.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. In a process which includes delivering a processing substance from a storage vessel to a processing station, said storage vessel enclosing a processing substance storage space and being coupled to conduits which communicate with said storage space, the improvement comprising a method for determining the quantity of processing substance in said storage space, which method comprises:

determining the volume occupied by a gas within a measurement volume which includes said storage space, including:

performing first and second pressure measurement for measuring the gas pressure in said measurement volume when said measurement volume contains respectively first and second quantities of gas; and determining the difference between said first and second quantities of gas;

wherein said gas volume determining is calculated as follows:

$$V_g = k \frac{(t_2 - t_1)T_k}{(P_2 - P_1)}$$

where $V_g$ is said gas volume;

k is a constant;

$T_k$ is the absolute temperature of said storage vessel in °K.; and $P_2$ and $P_1$ are said first and second pressure measurements at ending time $t_2$ and starting time $t_1$, respectively.

2. The process of claim 1 wherein said gas is argon.

3. The process of claim 1 wherein said processing station processes semiconductor wafers.

4. The process of claim 3 wherein said processing station deposits an aluminum layer on said semiconductor wafers.

5. The process of claim 1 wherein said processing substance is selected from the group of DMAH, TDMAT, TEOS, TMB, TMP, and Cu:VTMS.

6. The process of claim 1 further comprising determining said measurement volume by determining the volume occupied by a gas within said measurement volume when the volume of said processing substance in said storage space is between zero and a predetermined minimum.

7. In an apparatus which includes a storage vessel enclosing a processing substance storage space and conduits which communicate with said storage space for delivering a processing substance from said storage vessel to a processing station, the improvement comprising a system for determining the quantity of processing substance in said storage space, which system comprises:

means for determining the volume occupied by a gas within a measurement volume which includes said storage space, wherein said gas volume determining means comprises:

means for performing first and second pressure measurements for measuring the gas pressure in said measurement volume when said measurement volume contains respectively first and second quantities of gas;

means for determining the difference between said first and second quantities of gas; and calculator means for calculating said gas volume as follows:

$$V_g = k \frac{(t_2 - t_1)T_k}{(P_2 - P_1)}$$

where $V_g$ is said gas volume;

k is a constant;

$T_k$ is the absolute temperature of said storage vessel in °K.; and $P_2$ and $P_1$ are said first and second pressure measurements at ending time $t_2$ and starting time $t_1$, respectively.

8. The apparatus of claim 7 further comprising means for subtracting said determined gas volume from said measurement volume.

9. The apparatus of claim 7 wherein said gas is argon.

10. The apparatus of claim 7 wherein said processing station process semiconductor wafers.

11. The apparatus of claim 10 wherein said processing station deposits an aluminum layer on said semiconductor wafers.

12. The apparatus of claim 7 wherein said processing substance is selected from the group of DMAH, TDMAT, TEOS, TMB, TMP, and Cu:VTMS.

13. The apparatus of claim 7 further comprising means for determining said measurement volume by determining the volume occupied by a gas within said measurement volume when the volume of said processing substance in said storage space is between zero and a predetermined minimum.

14. A method for delivering a vaporized processing liquid from a storage vessel to a processing station and for determining the amount of said liquid remaining in said storage vessel, comprising the steps of:

a processing stage comprising the substeps of a first substep of delivering a first set mass flow rate of a carrier gas through a conduit into said liquid in said storage vessel, and a second substep of delivering said carrier gas and liquid vaporized therewith from a head space in said storage vessel to a processing chamber through an open valve; and a second step of measuring the volume of said head space in said storage vessel comprising the substeps of a first substep of closing said valve, a second substep of delivering a second mass flow rate of a second gas through said conduit into said liquid in said storage vessel while said valve is closed, a third substep of determining while said valve is closed and during said second substep a first pressure at a first time and a second pressure at a second time in said head space, and a fourth substep of calculating a volume of said head space from said first and second pressures and said first and second times.

15. The method of claim 14 wherein calculating substep calculates said volume of said head space from a ratio of a difference of said first and second times to a difference of said first and second pressures.

16. The method of claim 15 wherein said calculating substep calculates said volume of said head space from a product of said ratio and an absolute temperature of said storage vessel.

17. The method of claim 14 wherein said processing station processes semiconductor wafers.

18. A system for delivering a gas entrained liquid from a storage vessel containing said liquid and for determining an amount of said liquid remaining in said storage vessel, comprising:

a flow rate controller delivering a selectable mass flow rate of a carrier gas into said liquid contained in said storage vessel;

a valve in a conduit connecting a head space in said storage vessel to a processing station;

a pressure gauge measuring a pressure in said head space; and a controller which
in a processing mode, opens said valve to deliver said gas entrained with said liquid to said processing station; and in a measuring mode:
closes said valve,
determines from said pressure gauge a first pressure of said carrier gas at a first time and a second pressure of said gas at a second time, and
calculates said a volume of said head space from said first and second pressures and said first and said times.

19. The system of claim 18, wherein said controller calculates said volume of said head space from a ratio between a difference of said first and second pressures and a difference of said first and second times.

20. The system of claim 19 further including a temperature sensor associated with said storage vessel and wherein said controller calculates said volume of said head space from a product of said ratio and an absolute temperature derived from said temperature sensor.

21. The system of claim 18 further wherein said processing station is a semiconductor processing station.

* * * * *